May 12, 1970     S. O. RAYMOND     3,512,125
UNDERWATER ACOUSTIC TELEMETERING SYSTEM
Original Filed Oct. 10, 1966
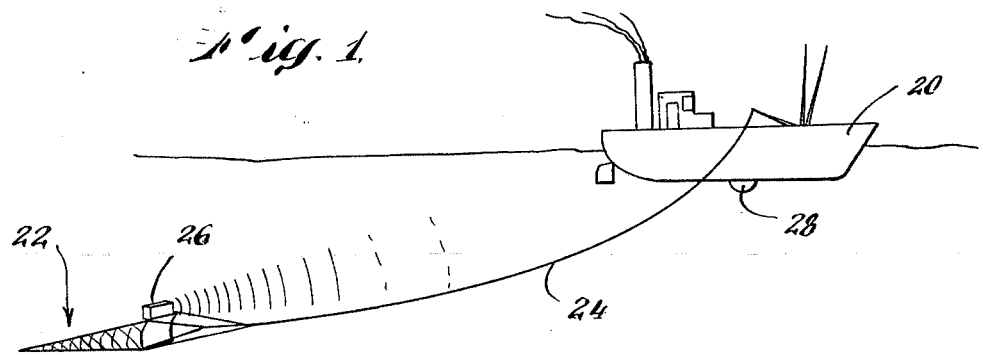
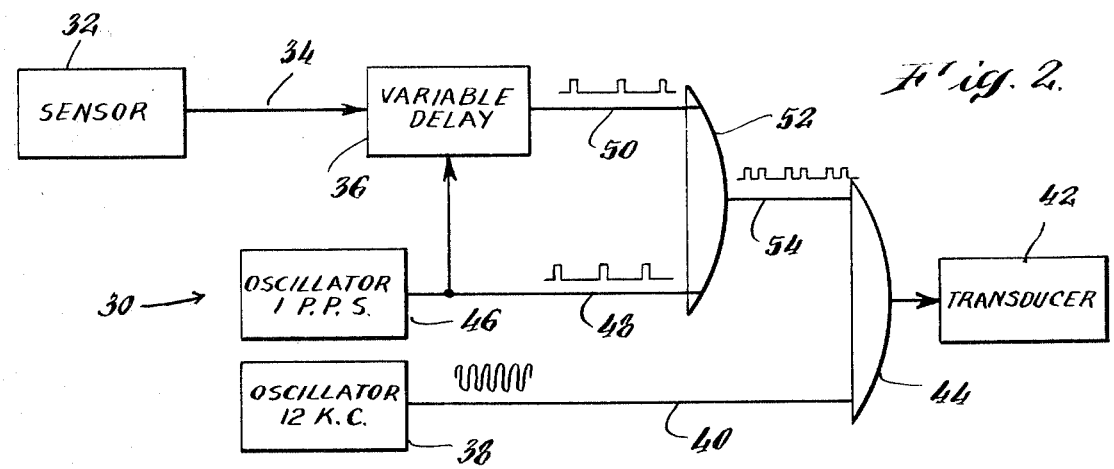
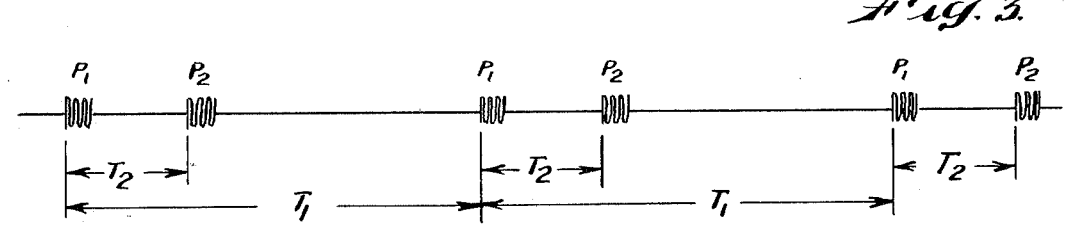
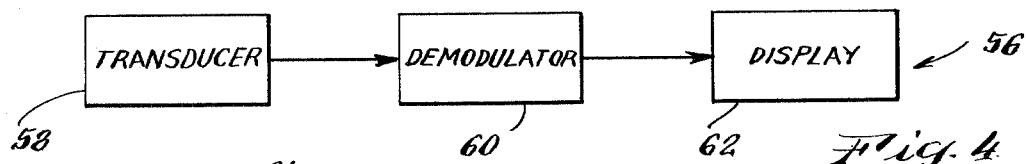
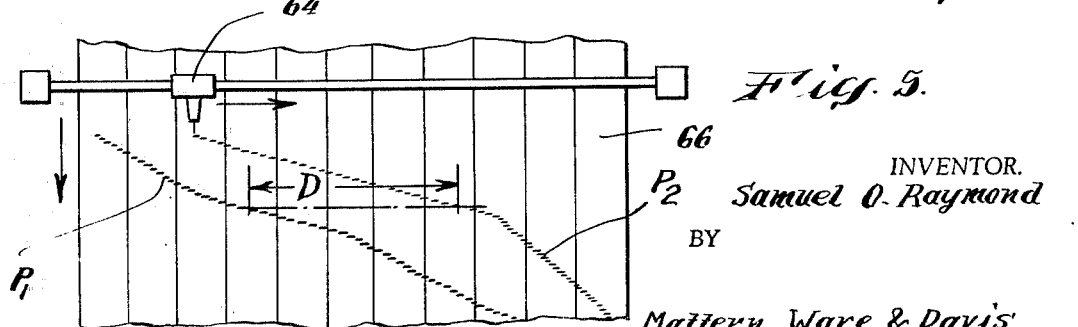
INVENTOR.
Samuel O. Raymond
BY
Mattern, Ware & Davis
ATTORNEYS.

United States Patent Office 3,512,125
Patented May 12, 1970

3,512,125
UNDERWATER ACOUSTIC TELEMETERING SYSTEM
Samuel O. Raymond, Cataumet, Mass., assignor to Benthos, Inc., North Falmouth, Mass.
Continuation of application Ser. No. 585,580, Oct. 10, 1966. This application Nov. 14, 1968, Ser. No. 778,361
Int. Cl. H04b 11/00
U.S. Cl. 340—5
10 Claims

ABSTRACT OF THE DISCLOSURE

This is a pulse position modulation telemetering system for conveying data from a trawl net under the ocean to a fishing trawler by means of acoustic pulses. Each data cycle begins with a reference pulse and is followed by a second pulse. The time interval between the pulses is proportional to the value of the variable being telemetered.

---

This application is a continuation of Ser. No. 585,580, filed Oct. 10, 1966, now abandoned.

The present application is closely related to the U.S. patent application of Clyde L. Tyndale, Gerald H. Efinger, and Samuel O. Raymond entitled "Multichannel Underwater Acoustic Telemetering System," now Patent No. 3,444,510. That application discloses a multichannel commercial embodiment of an underwater acoustic telemetering system and is incorporated herein by reference.

This invention relates to an underwater acoustic telemetering system. More particularly, it relates to an underwater telemetering system in which acoustic signals proportional to temperature, pressure or other variables are transmitted from an underwater transmitter to a receiver at or near the surface.

The invention has particular applicability to telemetering data from a trawlnet to a trawling ship. The embodiment of the invention disclosed herein comprises an acoustic pinger mounted to the trawlnet incorporating a pressure sensor. The pinger operates at a frequency of 12 kilocycles per second which is compatible with sonar receivers carried by many ships today. The pinger transmits short acoustic pulses having a frequency of 12 kilocycles per second at a pulse repetition frequency of approximately once per second. A second pulse is transmitted between these one second repeating pulses after an interval which is proportional to the pressure being measured at the trawlnet. Thus, the time between receipt of the once per second repeating pulses and the intermediate second pulses is proportional to depth and may be indicated at the ship by conventional receiving apparatus.

Many schemes have been proposed for telemetering information through water by acoustic waves. One form employs a frequency-modulated carrier; that is, a continuous frequency is transmitted and the frequency is changed slightly from a fixed frequency in proportion to the variable being transmitted. Another scheme which has often been proposed employs so-called pulse repetition rate modulation; that is, the acoustic waves are transmitted in short bursts, called pulses, comprising several waves of the fundamental frequency. The rate of repetition of these pulses is caused to be proportional to the variable being transmitted.

The frequency-modulated carrier system requires that the transmitter transmit continuously, thus consuming electrical power continuously. To conserve electrical power, the acoustic output of such a system must be necessarily low. On the other hand, with my telemeter, since information is transmitted in pulse form, the acoustic output during the pulse can be quite high. Thus, only a small average power is required.

The fundamental problem with the pulse repetition frequency modulation scheme is that pulse echoes are often received in the sea environment either due to the sound reaching the ocean floor and being reflected back to the receiver or reaching a layer of high change in acoustic velocity which also causes an echo. These echoes are received at the receiver, oftentimes with the same or greater amplitude as the direct signals due to variations in absorption of the various paths of the signals through the sea. As a result, it is sometimes impossible to distinguish between echoes and the direct signal and a true reading cannot be made at the receiver.

In recent years, mid-ocean trawling has become a preferred method of harvesting fish from the ocean. In such trawling, a large net (the trawl) is dragged on a long cable as much as two thousand yards behind the ship (the trawler) at depths of as much as three hundred fathoms. According to present practice, it is very difficult for the trawler captain to know the depth of his trawl and the condition of the mouth opening of the trawl. It is also desirable to know the temperature at the trawl. Sensors have been placed on the net and information transmitted to the trawler over an electrical cable. Such systems have proved troublesome, however, in the oceanographic environment. Thus, there has been a need for an underwater telemetering system for use by trawlers. The above-discussed frequency modulation and pulse repetition frequency systems were designed with this application in mind. However, they have not met with success due to the problems discussed above.

It is, therefore, an object of the present invention to provide an underwater acoustic telemetering system.

Another object of the invention is to provide an underwater acoustic telemetering system which overcomes the difficulties of the sound transmission characteristics of large bodies of water.

A further object of the invention is to provide an underwater acoustic telemetering system of the above character for transmitting depth information.

A still further object of the invention is to provide an underwater acoustic telemetering system of the above character for use by trawlers.

Another object of the invention is to provide a transmitter for an underwater acoustic telemetering system of the above character for mounting on a trawl.

Still another object of the invention is to provide an underwater acoustic telemetering system of the above character that is compatible with present acoustic receivers mounted on many trawlers.

A further object of the invention is to provide an underwater acoustic telemetering system of the above character that is rugged, simple, of low cost, and reliable in an oceanographic environment.

Other objects of the invention will in part be obvious and will in part appear hereinafter.

The invention accordingly comprises a system having the features of construction, combinations of elements, and arrangement of parts, utilizing a method comprising several steps and the relation of one or more of such steps with respect to each of the others, all as exemplified in the following detailed disclosure. The scope of the invention is indicated in the claims.

For a fuller understanding of the nature and objects of the invention, reference should be had to the following detailed description taken in connection with the accompanying drawing in which:

FIG. 1 is a side elevation illustrating the present invention as applied to trawling;

FIG. 2 is a block diagram of a transmitter according to the invention;

FIG. 3 is a timing diagram of the acoustical signals produced by the transmitter illustrated in FIG. 2;

FIG. 4 is a block diagram of a receiver according to the present invention; and, FIG. 5 is a portion of a chart produced by a graphical recorder connected to the receiver of FIG. 4.

The same reference characters refer to the same elements throughout the several views of the drawing.

The present invention can be generally described as a method and apparatus for underwater acoustic telemetering of a variable wherein acoustic pulses are transmitted at a fixed repetition rate. In between said pulses a second set of pulses are transmitted each at a time interval subsequent to the preceding one of said first pulses proportional to the variable.

Thus referring to FIG. 1, as applied to trawling, the trawler 20 tows the trawl, generally indicated at 22, by means of cable 24. The sensor transmitter 26 of the invention is mounted to the trawl. The acoustic receiver 28 is mounted to the bottom of the ship and may be the present receiver of the ship's depth echo sounder.

Referring to FIG. 2, the sensor transmitter of the invention is generally indicated at 30. It comprises a sensor 32, which may be a pressure or a temperature sensor producing on line 34 a variable electrical quantity, preferably voltage, proportional to the variable being sensed. This governs the operation of the variable delay 36 as will be explained below. The sensor transmitter includes an oscillator 38, preferably producing a continuous frequency of, for example, 12 kilocycles per second on line 40. This is gated to a conventional acoustic transducer 42 by means of AND gate 44. The sensor transmitter includes an oscillator 46 producing on line 48 a short pulse of, for example, ten milliseconds duration at a repetition rate of one pulse per second. This is also supplied to the variable delay 36.

In response to the one pulse per second on line 48 and the variable electrical quantity on line 34, variable delay 36 produces a short pulse at a time after receiving a pulse on line 48 proportional to the electrical quantity on line 34. These delayed pulses are supplied via line 50 to an OR gate 52. A second input to the OR gate 52 is line 48. Thus, the output pulses on line 54 from OR gate 52 are the combined one pulse per second from the oscillator 46 and the delayed pulses from variable delay 36.

AND gate 44 gates the continuous 12 kilocycles signal on line 40 from oscillator 38 to the transducer 42 so that acoustic pulses are produced as shown in FIG. 3. These may be conveniently designated at Ping one $P_1$ and Ping two $P_2$. As shown in FIG. 3, Ping one occurs once each fixed time interval $T_1$ (in the example given once per second) and Ping two occurs at a time interval $T_2$ after Ping one. $T_2$ is a function of the variable being sensed.

The system of the invention is compatible with receivers of conventional depth echo sounders as generally indicated at 56 in FIG. 4. These receivers comprise a transducer 58, demodulator 60 and display 62 which may be a graphical recorder. In such recorders, as shown in FIG. 5, the pen 64 moves at a constant rate from left to right scanning across the chart paper 66. When reaching the extreme right, it rapidly returns to the extreme left and the chart is advanced upwardly a small amount to be ready for the next such scan across the chart paper. When the pings are received, the pen 64 marks the chart 66. Thus, the horizontal distance D between two markings is equal to the variable being measured.

In the usual depth measurement by echo sounding, the movement of the pen 64 at the beginning of a line is initiated by a primary acoustic pulse generated on the ship, which provides the first marking, and the return or echo pulse causes the second marking to be recorded. Thus the oscillograph is not free-running, but runs instead under control of the primary pulse generation. In the present system this is, of course, not possible, since the pulses are all generated remotely from the ship, and in any case such signals would be meaningless. In accordance with the present invention the oscillograph is operated in the "free-running" condition, i.e., each scan of the pen 64 follows the preceding one continuously during operation, at a predetermined scan repetition rate and pen speed.

It is preferred that the rate of travel of the pen 64 be synchronized with the rate of transmission of Ping one. Thus as shown in FIG. 5, although perfect synchronization has not been achieved, it is close enough that the lines formed by Ping one and Ping two can readily be distinguished from noise pulses (not shown) which are randomly received. Thus, by correlating the rate of operation of a free-running oscillograph recorder with the repetition rate of Ping one, the advantage results that even a weak signal can readily be distinguished from random noise, since the successive Pings appear as two readily discernible spaced lines as shown at $P_1$ and $P_2$ in FIG. 5. In the above context, the term free-running signifies that the oscillator is running at its own natural rate, even though that rate is deliberately set in accordance with the repetition rate of the Pinger.

It will be apparent to those skilled in the art that the rate of pen travel across the chart 66 may be an integral multiple or sub-multiple of the rate of transmission of Ping one in order to achieve this result. Because of this synchronization it is possible to make a record of the telemetering even if the noise is greater than the signal. This is because the noise is random while the telemetering pings come at only slowly varying times. Thus the two sets of pings are traced as lines, the distance between them being a measure of the variable being telemetered. This is called auto correlation.

In order to distinguish between Ping one and Ping two, the delay provided by variable delay 36 is chosen to lie within limits that put Ping two always closer to the preceding or subsequent Ping one. Thus if $T_1$ equals one second, the delay may vary from 20 to 400 milliseconds.

A single variable instrument of the kind described is most useful to trawlers if it transmits the depth; in which case, sensor 32 would be a pressure sensor such as the R type manufactured by Bourns, Inc. of Riverside, Calif.

The oscillators 38 and 46, AND gate 44, and OR gate 52 are conventional. The variable delay 36 may be a variable delay line or may be formed of a pair of one-shot multivibrators connected in series—the delay of the first multivibrator being proportional to the electrical quantity on line 34. The pulse produced by the second delay after the variable delay time is then of fixed length and preferably equal to that produced by the oscillator 46. The transducer 42 is conventional and may include an amplifier when necessary. Such can be procured from applicant's assignee and other suppliers.

It will be understood by those skilled in the art that the system of the present invention may be used to transmit other variables, such as temperature and salinity, using appropriate sensors. Additional pings may be employed for telemetering more than one variable and the pings may be of different frequencies to facilitate recognition. Furthermore, other forms of display 62 may be incorporated into the receiver 56, such as digital displays presenting a digital reading of the variable being transmitted.

It will also be understood by those skilled in the art that the time $T_2$ may be any conveniently realizable function of the variable sensed and does not have to be directly proportional as in the example given. Furthermore, other forms of synchronous receivers may be used to perform the auto correlation function of the graphical recorder of FIG. 5.

It will thus be seen that the objects set forth above among those made apparent from the preceding description are efficiently attained and since certain changes may be made in the system, constructions and method set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A system of acoustic telemetering in a noisy or echo-producing acoustical environment comprising:
    (A) means for generating a first series of acoustic pulses at a substantially fixed frequency;
    (B) means for generating at least one other series of acoustic pulses, each of said other series of acoustic pulses occurring at a time subsequent to one of said first series of acoustic pulses which is a function of a variable being measured and telemetered; and,
    (C) means for recording said acoustic pulses at a receiver on an oscillograph free-running with respect to said first series of acoustic pulses and operating at a frequency which is substantially an integral multiple or submultiple of the frequency of said series of acoustic pulses;
whereby the value of the variable being telemetered may be determined by measuring the distance between lines on a graph produced by said oscillograph indicating receipt of said first and second series of acoustic pulses.

2. The system defined in claim 1 wherein said generating means comprise:
    (a) a sensor for sensing a variable and producing an electrical quantity which is a function of the sensed variable;
    (b) an oscillator producing a first series of pulses at a fixed rate;
    (c) a variable delay line responsive to said electrical quantity and to said pulses from said oscillator, to thus produce a second set of delayed pulses thereafter, each occurring at a time after one of said first series of pulses which is an analog function of said electrical quantity;
    (d) a second oscillator for producing a relatively high frequency carrier signal compared to the frequency of said first oscillator;
    (e) gating means for gating said second oscillator with the pulses produced by said first oscillator and said variable delay line; and
    (f) an acoustic generator driven by the output of said gating means to produce said first and a second series of acoustic pulses.

3. The system defined in claim 1 wherein said generating means comprise:
    (a) a sensor for sensing a variable and producing an electrical quantity which is a function of the sensed variable;
    (b) an oscillator producing a first series of pulses at a fixed rate;
    (c) a first and a second delay multivibrator connected in series, said first multi-vibrator being responsive to said electrical quantity and to each of said pulses from said oscillator to produce a delayed output which is a function of the sensed variable, and said second multi-vibrator being responsive to each of said delayed outputs to produce one of a second series of delayed pulses each occurring subsequent to a pulse of said first series of pulses at a time which is an analog function of said electrical quantity;
    (d) a second oscillator for producing a relatively high frequency carrier signal compared to the frequency of said first oscillator;
    (e) gating means for gating said second oscillator with the pulses produced by said first oscillator and said second multi-vibrator; and,
    (f) an acoustic generator driven by the output of said gating means to produce said first and second series of acoustic pulses.

4. An acoustic telemetering system having a transmitter suitable for use under water comprising waterproof means enclosing:
    (a) a sensor for sensing a variable and producing an electrical quantity which is a function of the sensed variable;
    (b) an oscillator producing a first series of pulses at a fixed rate;
    (c) a variable delay line responsive to said electrical quantity and to said pulses from said oscillator, to thus produce a second set of delayed pulses thereafter each occurring at a time after one of said first series of pulses which is an analog function of said electrical quantity;
    (d) a second oscillator for producing a relatively high frequency carrier signal compared to the frequency of said first oscillator;
    (e) gating means for gating said second oscillator with the pulses produced by said first oscillator and said variable delay line; and
    (f) an acoustic generator driven by the output of said gating means to produce a first and a second series of acoustic pulses.

5. An acoustic telemetering system having a transmitter suitable for use under water comprising waterproof means enclosing:
    (a) a sensor for sensing a variable and producing an electrical quantity which is a function of the sensed variable;
    (b) an oscillator producing a first series of pulses at a fixed rate;
    (c) a first and a second delay multi-vibrator connected in series, said first multi-vibrator being responsive to said electrical quantity and to each of said pulses from said oscillator to produce a delayed output which is a function of the sensed variable, and said second multi-vibrator being responsive to each of said delayed outputs to produce one of a second series of delayed pulses each occurring subsequent to a pulse of said first series of pulses at a time which is an analog function of said electrical quantity;
    (d) a second oscillator for producing a relatively high frequency carrier signal compared to the frequency of said first oscillator;
    (e) gating means for gating said second oscillator with the pulses produced by said first oscillator and said second multi-vibrator; and,
    (f) an acoustic generator driven by the output of said gating means to produce a first and a second series of acoustic pulses.

6. The system defined in claim 1, 2, 3, 4 or 5 wherein each pulse of said second series of acoustic pulses always occurs to closer to one of the preceding or subsequent pulses of said first series of acoustic pulses than to the other.

7. The system defined in claim 1, 2, 3, 4 or 5 wherein the carrier frequency of said first series of acoustic pulses is different from the carrier frequency of said second series.

8. The system defined in claims 1, 2, 3, 4 or 5 wherein said first series of acoustic pulses are produced at a rate of approximately one pulse per second.

9. The system defined in claims 1, 2, 3, 4 or 5 wherein the carrier frequency of said acoustic pulses is approximately 12 kilocycles per second.

10. The system defined in claims 2, 3, 4 or 5 wherein said sensor is a temperature sensor.

References Cited
UNITED STATES PATENTS

| | | | |
|---|---|---|---|
| 2,498,933 | 2/1950 | Wallace | 343—112.2 |
| 2,729,910 | 1/1956 | Fryklund. | |
| 3,159,832 | 12/1964 | Cox | 343—112.4 |

RODNEY D. BENNETT, JR., Primary Examiner

J. G. BAXTER, Assistant Examiner

U.S. Cl. X.R.

346—33